US006719491B2

(12) United States Patent
Kezele et al.

(10) Patent No.: US 6,719,491 B2
(45) Date of Patent: *Apr. 13, 2004

(54) FLUID LEVEL CONTROL SYSTEM

(75) Inventors: Dusko Antonio Kezele, London (CA); Jason J. Cerny, London (CA); Alan J. Royce, London (CA); Fariborz Taghipour, London (CA); George Traubenberg, London (CA); Edward P. Kambulow, London (CA)

(73) Assignee: Trojan Technologies Inc., London (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/067,398

(22) Filed: Feb. 7, 2002

(65) Prior Publication Data

US 2003/0024859 A1 Feb. 6, 2003

Related U.S. Application Data

(63) Continuation-in-part of application No. 09/921,268, filed on Aug. 3, 2001.

(51) Int. Cl.[7] ................................................. E02B 7/40
(52) U.S. Cl. ......................... 405/100; 405/87; 405/94; 405/99; 405/93; 210/262
(58) Field of Search .............................. 405/94, 87, 99, 405/100, 93; 210/744, 262

(56) References Cited

U.S. PATENT DOCUMENTS

| 648,312 A | * | 4/1900 | Taylor | ........................... 405/93 |
| 973,172 A | * | 10/1910 | Collar | ........................... 405/97 |
| 3,217,497 A | * | 11/1965 | Humphreys et al. | .......... 405/93 |
| 3,300,985 A | * | 1/1967 | Humphreys et al. | .......... 405/93 |
| 3,815,627 A | * | 6/1974 | Farrell et al. | ................ 137/486 |

(List continued on next page.)

FOREIGN PATENT DOCUMENTS

| DE | 340979 | 9/1921 | |
| DE | 0458224 a1 | 5/1991 | ............. E03F/5/10 |
| EP | 422233 | 7/1921 | |
| FR | 2033187 | 12/1970 | ............. E02B/7/00 |

OTHER PUBLICATIONS

"Emerging Technologies Energy Water Connection", ITRC Report 01–003.
"Flap Gate For Automatic Upstream Canal Control", Charles M. Burt, Russdon Angold, Mike Lehmkuhl, and Stuart Styles, Irrigation Training And Research Center, California Polytechnic State University.

*Primary Examiner*—J. J. Swann
*Assistant Examiner*—Katherine W Mitchell
(74) *Attorney, Agent, or Firm*—Katten Muchin Zavis Rosenman

(57) ABSTRACT

A fluid level control system, particularly useful for controlling the level of water flowing in an open channel. The fluid level control system includes a gate having a flap portion interconnected to a lever portion. The flap portion is rotatable about a first pivot point. The system further includes a frame which is fixed with respect to the flap portion. A linkage interconnects the flap portion and the lever portion, and is connected to the frame at a second pivot point different than the first pivot point. Under changing flow conditions in the channel, the present system operates by both: (i) absolute movement of the lever portion and the flap portion, and (ii) relative movement between the lever portion and the flap portion. A fluid treatment system and a method for controlling the level of a flowing fluid may also use such a fluid level control system.

47 Claims, 6 Drawing Sheets

U.S. PATENT DOCUMENTS

| | | | |
|---|---|---|---|
| 4,073,147 A | * | 2/1978 | Nomura .................... 405/94 |
| 4,346,824 A | * | 8/1982 | Miller et al. .............. 222/504 |
| 4,482,809 A | | 11/1984 | Maarschalkerweerd ..... 250/436 |
| 4,606,672 A | | 8/1986 | LeSire ..................... 405/87 |
| 4,685,828 A | * | 8/1987 | Whittle .................... 405/87 |
| 4,872,980 A | | 10/1989 | Maarschalkerweerd ..... 210/243 |
| 4,877,352 A | | 10/1989 | Tuttle et al. .............. 405/104 |
| 5,006,244 A | | 4/1991 | Maarschalkerweerd ..... 210/243 |
| 5,222,834 A | * | 6/1993 | Schultz .................... 405/94 |
| 5,418,370 A | | 5/1995 | Maarschalkerweerd ..... 250/431 |
| 5,516,230 A | | 5/1996 | Bargeron et al. .......... 405/100 |
| 5,539,210 A | | 7/1996 | Maarschalkerweerd ..... 250/372 |
| 5,590,390 A | | 12/1996 | Maarschalkerweerd .. 422/186.3 |
| 6,171,023 B1 | | 1/2001 | Townshend ............... 405/94 |
| 6,193,938 B1 | | 2/2001 | Wedekamp ............. 422/186.3 |
| 6,196,764 B1 | * | 3/2001 | Bayssiguier ............. 405/102 |

\* cited by examiner

FLUID LEVEL CONTROL SYSTEM

CROSS-REFERENCE TO RELATED APPLICATION

The is application is a continuation-in-part of U.S. patent application Ser. No. 09/921,268, filed Aug. 3, 2001.

BACKGROUND OF THE INVENTION

1. Field of the Invention

In one of its aspects, the present invention relates to a fluid level control system. In another of its aspects, the present invention relates to fluid treatment system comprising such a fluid level control system. In yet another of its aspects, the present invention relates to a method of controlling the level of a flowing fluid.

2. Description of the Prior Art

Fluid treatment systems are known generally in the art.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp frames which include several UV lamps, each of which are mounted within sleeves which extend between and are supported by a pair of legs which are attached to a crosspiece. The so-supported sleeves (containing the UV lamps) are immersed in a fluid to be treated which is then irradiated, as required. The amount of radiation to which the fluid is exposed is determined by factors such as the proximity of the fluid to the lamps, the output wattage of the lamps and the fluid flow rate past the lamps. Thus, the UV lamp modules described in the Maarschalkerweerd #1 Patents are typically employed in an open, channel-like system which has a gravity fed flow of water passing therethrough.

U.S. Pat. Nos. 5,418,370, 5,539,210 and 5,590,390 (all in the name of Maarschalkerweerd and all assigned to the assignee of the present invention and hereinafter referred to as the Maarschalkerweerd #2 Patents) describe a fluid treatment system which combines the advantageous features of a closed fluid treatment system in the area where the lamps irradiate the fluid passing thereby by placing a particular architecture in an open channel containing a flow of fluid.

Regardless of whether a fluid treatment system employs the modules taught in the Maarschalkerweerd #1 patents or the architecture taught in the Maarschalkerweerd #2 patents, it is typical to control the level of fluid passing through the open channel by means of a level gate or the like disposed downstream of the fluid treatment device.

Thus, fluid level gates are known generally in the prior art. For background information, see, for example, IRTC Report 01-003 and "Flap Gate for Automatic Upstream Canal Control", both available from Irrigation Training and Research Center (San Luis Obispo, Calif.).

For example, U.S. Pat. No. 4,606,672 [LeSire] teaches a canal upstream level gate which comprises a gate depending down into a flowing stream from a pivotal access transverse to the stream and an arm extending downstream from the access and gate containing a ballast to force the gate against the flowing stream. The ballast is adjustable along the arm thereby causing the gate to retain an upstream water level as a function of the ballast position therealong. A purported advantage of this device is elimination of trial and error measurements to achieve correct position of the ballast for a desired height of fluid flow upstream of the device.

U.S. Pat. No. 4,877,352 [Tuttle et al. (Tuttle)] teaches a method and an apparatus for control of an upstream water level. The apparatus operates by adjustment of the elevation of a trough assembly of a weir. The weir is slidably mounted in a trough assembly which can be raised or lowered with respect to the flow of fluid. Two vertical screw shafts extend downwardly from a tandem screw jack assembly and are bolted to the trough assembly. The vertical screw shafts raise or lower the trough assembly through rotation of a hand crank—FIG. 3 of Tuttle illustrates this vertical adjustment feature.

U.S. Pat. No. 5,516,230 [Bargeron et al. (Bargeron)] teaches a gate for controlling upstream water level. This gate is purportedly self-actuating and comprises a stepped, radial gate face mounted on a pair of hinge arms extending downstream to a pivot shaft and to a counterweight and support system. The support system for the counterweight includes a pattern of holes and counterweight angle adjustment cams. To adjust the level of fluid upstream of the device, these counterweight angle cams are rotated with a wrench which results in a change to the angle of the risers with respect to the hinge arms connected to the radial gate face. Thus, manual intervention is required to "set" the function of this device.

U.S. Pat. No. 6,171,023 [Townshend] teaches a water gate assembly comprising a self-actuating top-hung gate for controlling the flow of fluid in a waterway. The gate is pivotally mounted on a pair of piers located above an upstream section of the gate for allowing the gate to pivot between a closed position and an open position in which water flows beneath the gate. A ballast tank is included in the device and is capable of being charged and discharged via an appropriate inlet and outlet, respectively. In operation, the ballast tank is charged and discharged with water flowing through the waterway.

U.S. Pat. No. 6,193,938 [Wedekamp] teaches a device for treating pre-purified waste water liquid with UV radiation. The device includes an outlet chamber having a weir element which includes a damming wall extending upwardly in the flow of fluid. Several individual weir elements are arranged on the slanted damming wall, the weir elements being formed by upwardly extending tubes. Thus, the flow control system of Wedekamp appears to be a static system in which "flowing wastewater no longer impacts a vertical damming wall".

Thus, it appears that the prior art approach of controlling fluid flow in an open channel is to have a dynamic element which pivots about a single point only (e.g., the approach taught in any one of LeSire, Tuttle, Bargeron and Townshend) or a static system (e.g., Wedekamp).

A problem with conventional dynamic fluid control systems is that they must be adjusted manually to a preset level empirically determined or by calculation of a formula. The problem with the static system of Wedekamp is that it is complicated and costly to construct and must be cast into the open channel through which the fluid flows. Since, in many cases, such open channels are part of an existing fluid treatment plant, the retrofitting cost of adopting the Wedekamp approach is relatively high.

Further, conventional fluid level control systems produce a water level rise as flow increases in order to provide the required discharge. Accordingly, these systems require a relatively large installation footprint which require designers to build channels that are flared or are longer to accommodate these systems at the required flow capacity.

Thus, it would be desirable to have an improved fluid level control system which alleviates one or more of the above-mentioned disadvantages of the prior art.

SUMMARY OF THE INVENTION

It is an object of the present invention to obviate or mitigate at least one of the above-mentioned disadvantages of the prior art.

In one of its aspects, the present invention provides fluid level control system comprising:

a gate having a flap portion interconnected to a lever portion, the flap portion being rotatable about a first pivot point, the flap portion comprising a first weight;

a frame fixed with respect to the flap portion; and a linkage interconnecting the flap portion and the lever portion and being connected to the frame at a second pivot point different than the first pivot point;

wherein the flap portion is rotatable about the first pivot point upon being contacted by the flow of fluid and the linkage is rotatable about the second pivot point to change a closing moment of the gate.

In another of its aspects fluid treatment system comprising:

(i) a fluid treatment zone disposed in an open channel having a flow of fluid therein, and (ii) fluid level control system comprising:

a gate having a flap portion interconnected to a lever portion, the flap portion being rotatable about a first pivot point, the flap portion comprising a first weight;

a frame fixed with respect to the flap portion; and a linkage interconnecting the flap portion and the lever portion and being connected to the frame at a second pivot point different than the first pivot point;

wherein the flap portion is rotatable about the first pivot point upon being contacted by the flow of fluid and the linkage is rotatable about the second pivot point to change a closing moment of the gate.

A method for controlling the level of a flow of fluid in a channel at a desired level with a fluid level control system comprising: a gate having a flap portion interconnected to a lever portion, the flap portion being rotatable about a first pivot point, the flap portion comprising a first weight; a frame fixed with respect to the flap portion; and a linkage interconnecting the flap portion and the lever portion and being connected to the frame at a second pivot point different than the first pivot point, the method comprising the steps of:

disposing the flap portion in the channel such that the flow of fluid contacts the flap portion at a first applied force; and altering a flow condition of the fluid to cause the flow of fluid to contact the flap portion at a second applied force different than the first applied force to cause relative movement between the flap portion and the lever portion.

In another of its aspects, the present invention provides a fluid level control system comprising: a gate having a flap portion connected to a linkage which is adjustable with respect to the flap portion; wherein the flap portion is movable upon being contacted by an applied force thereby causing movement of the linkage to cause adjustment of a closing moment of the gate and control of the rate of change of an upstream level of a fluid flow through the system, the flap portion comprising a first weight.

Thus, the present inventors have conceived of a novel approach to the design a of fluid level control system. This novel approach is a significant deviation from prior art approaches. Generally, in the present fluid level control system, as a flow of fluid at a steady state flow condition changes (i.e., steady state flow condition becomes a transient flow condition), the resulting change to the applied force on the gate of the present fluid level control system results in relative movement between the lever portion and the flap portion. In contrast, the prior art approach has been to fix the flap portion with respect to the gate so that, under a similar transient flow condition, the flap portion and the lever portion move as a unit and there is no relative movement between the two. In the preferred embodiment, the approach involves the flow of fluid to actuate the flap portion to rotate about a first pivot point which serves to actuate the linkage to rotate about a second pivot point independent of the first pivot point. This results in a fluid level control system having a number of advantages.

Conventional weirs, gates and other fluid level control devices have been used to maintain upstream water depth within a desired elevation range. However, most open channel level control devices produce a water level rise (increase in head) as flow increases in order to provide the required discharge. Such control devices typically have large installation footprints, which force designers to build channels that must be flared or are extra long to accommodate the devices at the required flow capacity. The present fluid level control system obviates the requirement to modify the channel; the only condition being substantially free discharge (i.e., substantially no backwater pressure) downstream of the gate. The present fluid level control system may be installed directly into a prismatic channel with a footprint approximately equal to the cross-section of the channel.

In a preferred embodiment, the present fluid level control system will accurately control upstream depth of water in the channel without incurring additional head (increase in water elevation) up to an inlet flow velocity of 1.3 m/sec or more. In the preferred embodiments of the present fluid level control system, this control is achieved on-line and in situ (i.e., continuous self-adjustment of the system without the requirement for manual intervention).

BRIEF DESCRIPTION OF THE DRAWINGS

Embodiments of the present invention will be described with reference to the accompanying drawings in which like numerals designate like elements, and which.

DETAILED DESCRIPTION OF THE PREFERRED EMBODIMENTS

Figure 1:
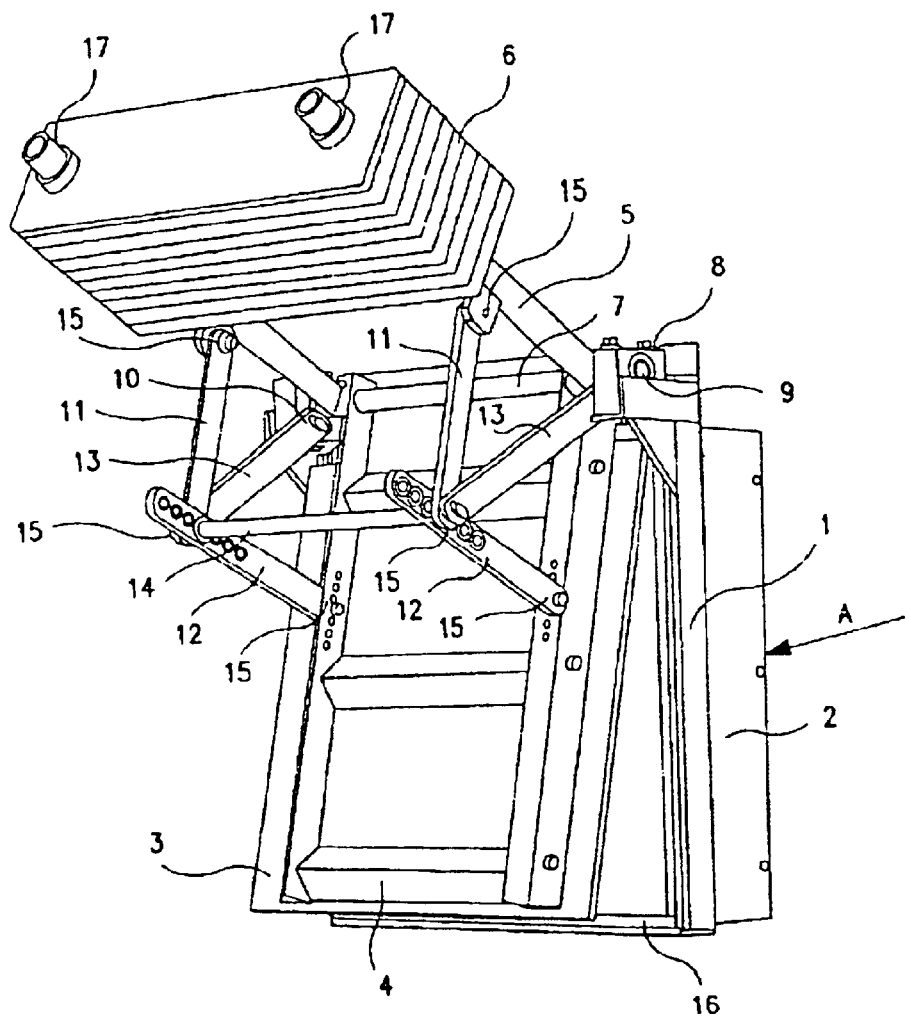
FIG. 1 illustrates a downstream perspective view of a preferred embodiment of the present fluid level control system.

With reference to FIG. 1, there is illustrated a preferred embodiment of the present fluid level control system comprising a mounting frame 1. Mounting frame 1 comprises a mounting side plate 2.

A gate includes a gate flap 3 connected to mounting frame 1 via a flap support frame 4. A pair of lever arms 5 are connected to flap support frame 4. A plurality of counterweights 6 near the distal end of lever arms 5. A pair of opposed hinge blocks 8 are disposed on mounting frame 1 and have a primary pivot shaft 7 disposed therebetween. Each hinge block 8 comprises a spherical bearing 9 for ready pivoting of the combination of lever arms 5 and gate flap 3 about a first pivot point in hinge blocks 8.

Flap support frame 4 and lever arms 5 are interconnected by the combination of two pairs of struts, each pair of struts comprising a first strut 11 and a second strut 12. Each of first strut 11 and second strut 12 are connected to each other via a linkage bushing 15 which also serves to interconnect a third strut 13 emanating from mounting frame 1 at a second pivot point 10 independent of the first pivot point disposed in hinge block 8. A linkage shaft 14 interconnects the opposed pair of linkage bushings 15.

A sealing gasket 16 is disposed about the periphery of mounting frame 1. A retaining collar 17 is disposed on each lever arm 5 to retain lever counterweights 6 in position.

Figure 2:
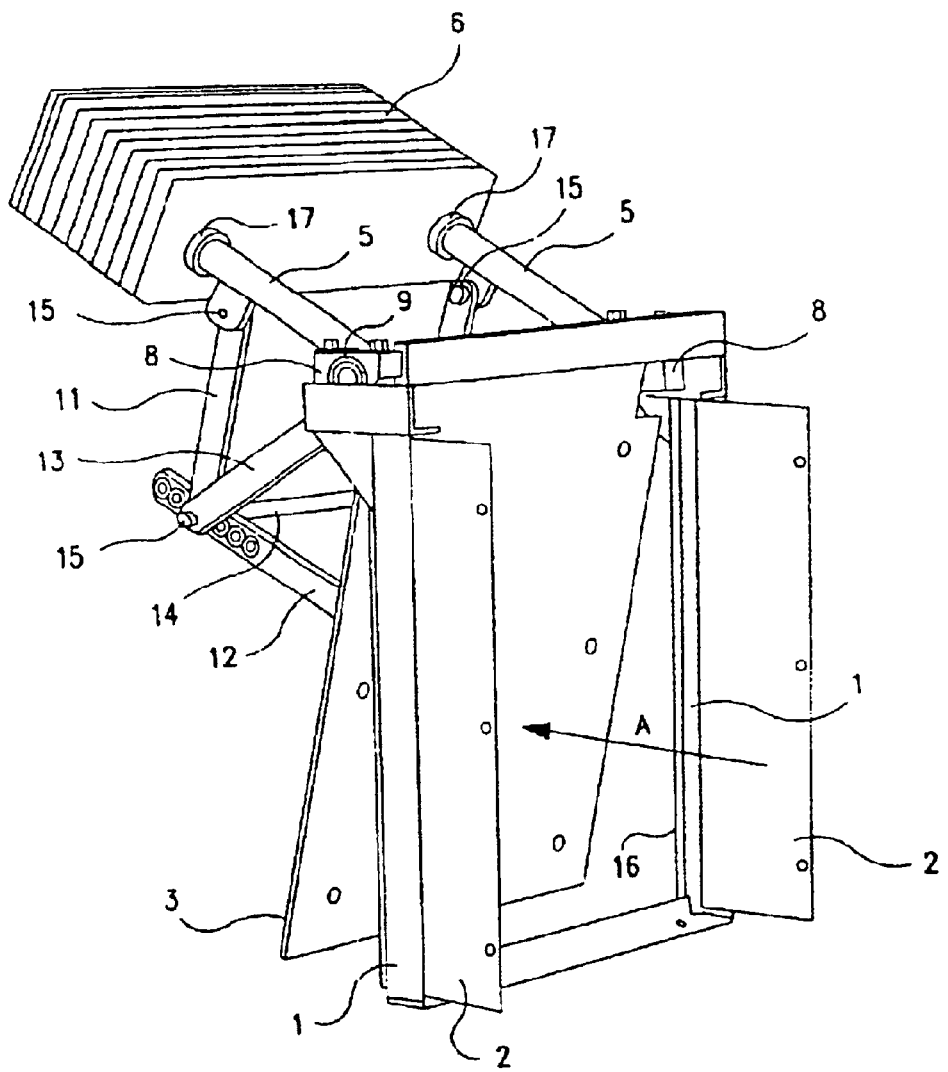
FIG. 2 illustrates an upstream perspective view of the embodiment illustrated in FIG. 1.
Figure 3:
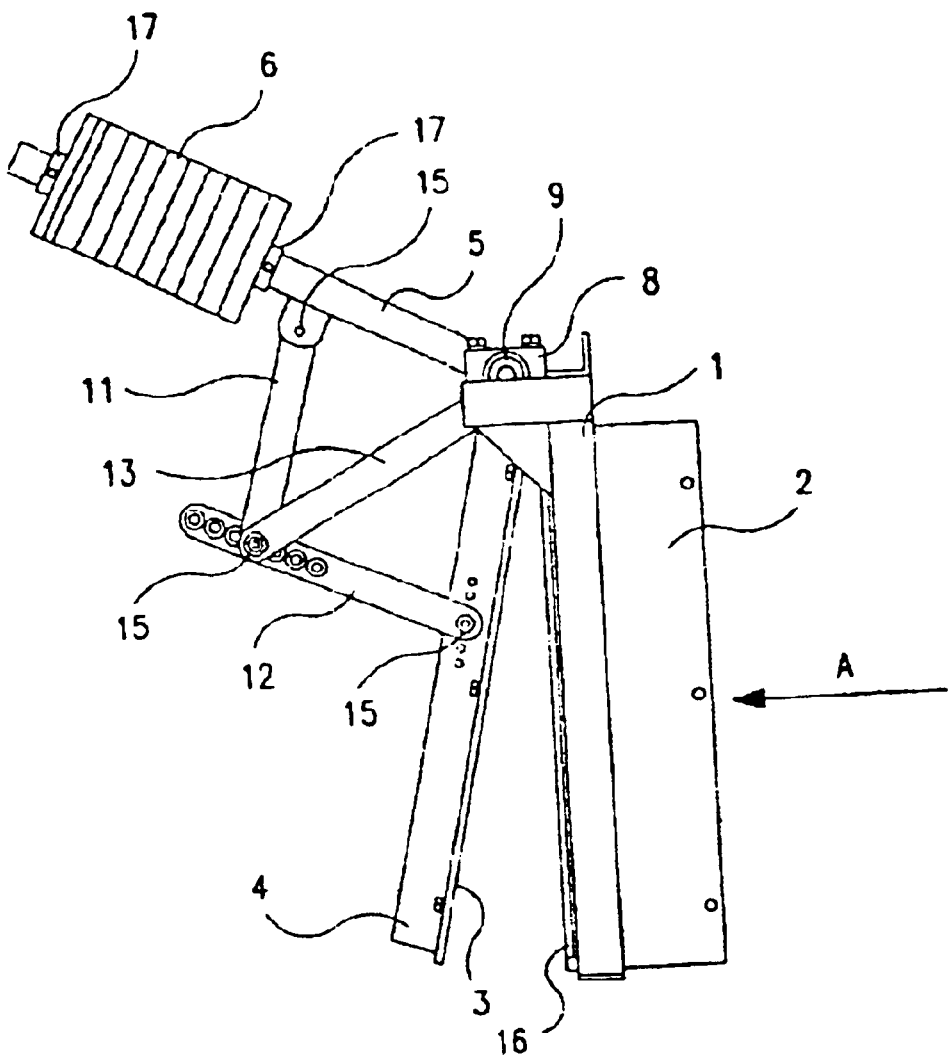
FIG. 3 illustrates a side elevation of the embodiment of the present fluid level control system illustrated in FIGS. 1 and 2.

This preferred embodiment of the present fluid level control system illustrated in FIGS. 1–3 may be installed in a suitably sized channel by affixing the fluid level control system to the channel via frame 1 and side plates 2.

Once installed, a flow of fluid moving generally in a direction of arrow A will contact the fluid level control system.

An opening moment is produced by the interplay of both potential and kinetic energy of the flowing fluid acting on the gate flap. This interplay results in a pressure distribution on the upstream side of the gate flap that is a function of the size and shape of the gate as well as its opening angle. The pressure distribution produces a net opening moment acting about the primary pivot point in hinge block 8—this is referred to herein as the hydraulic moment. This hydraulic moment is characteristically a maximum when the gate is fully closed and diminishes in a non-linear manner with the rate of flow. Using conventional techniques, the hydraulic moment may be modeled as a function of gate flap geometry, gate flap opening-angle, upstream water depth and flow rate. Using such conventional modeling techniques, the hydraulic moment for a given gate design may be readily predicted for a wide range of gate sizes for that gate design.

Once the hydraulic moment has been accurately characterized, a restoring moment may be readily tailored for the gate by means of a levered counterweight and a mechanical linkage acting about a primary pivot point of the gate. In the present fluid level control system, a secondary pivot point, different than the primary pivot point, is located on the support frame. Rotation of the gate flap about the primary pivot point causes rotation of the linkage about the secondary pivot point that, in turn, adjusts the closing moment of the gate flap such that it matches the hydraulic moment over a wide range of opening angles. Thus, in essence, the linkage and the secondary pivot point allow the gate to adjust the closing moment to best match the hydraulic moment acting on the gate flap. As will be appreciated by those of skill in the art, an important advantage of the present fluid level control system is its capability to vary the closing moment to best match the hydraulic moment acting on the gate flap.

The linkage is constructed such that the Closing Moment is substantially equal and substantially opposite in direction to the Hydraulic Moment under conditions of steady flow and transient flow which thereby maintains a constant upstream water level. However, in a preferred embodiment, the gate linkage may also be constructed such that, under transient flow conditions (e.g., flow rate changing with respect to time), the response of the gate can be changed to allow the rate of change of upstream depth either to: (i) increase with the rate of change of flow, or (ii) decrease with the rate of change of flow.

This adjustability allows the gate to be used in applications where a variable upstream water level, with respect to flow rate, is required.

At any time the steady state water level can be adjusted by merely changing the position and/or location of lever counterweights 6. Adjustments to the transient response of the gate (e.g., the rate the change of upstream depth with flow rate) can be adjusted by changing the geometry of the linkage (for example, by adjusting the relative location of struts 11,12,13 via bushings 15 in the embodiment illustrated in FIGS. 1–3).

Thus, unlike the prior art approach of having a single pivot point for the gate flap, the present fluid level control system is characterized by having two independent pivot points. This allows for adjustment of the closing moment of the gate flap to substantially equal the hydraulic moment acting on the gate.

Figure 4:
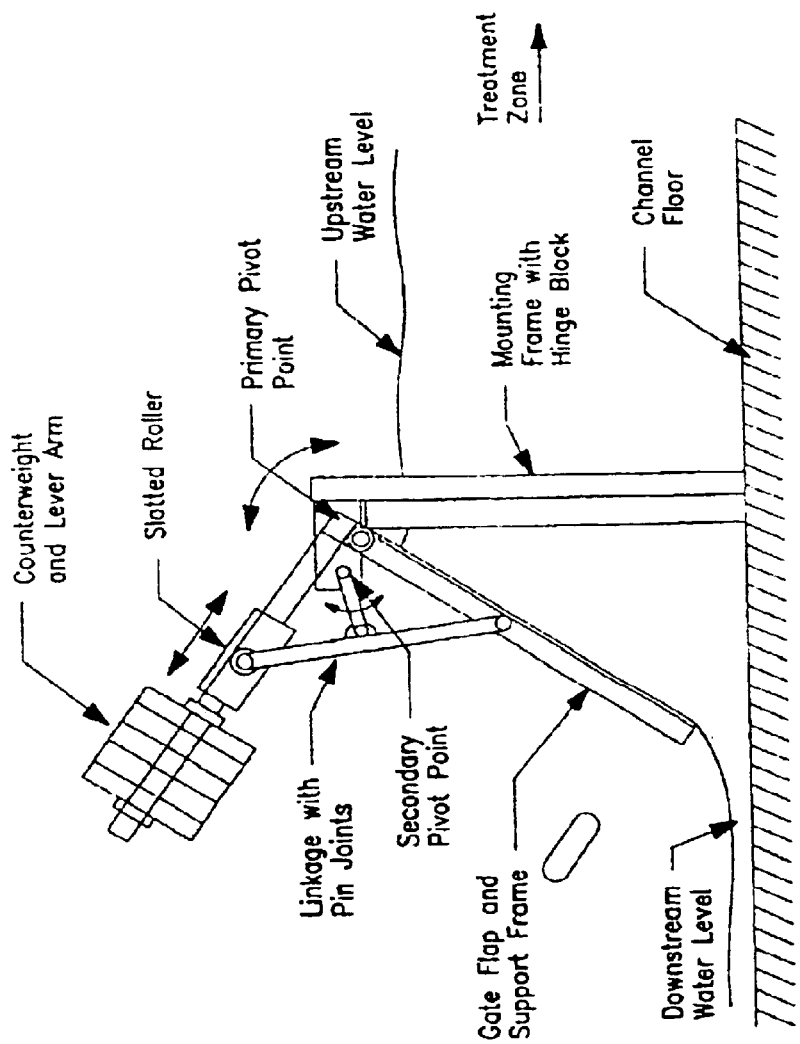
FIG. 4 illustrates a side elevation, in schematic, of a first alternate embodiment of the present fluid level control system.

With reference to FIG. 4, there is illustrated an alternate embodiment of the present fluid level control system. In this embodiment, the counterbalance gate uses a linkage involving pin joints and a slotted roller connection. Note that a slider can replace the roller to achieve the same nonlinear restoring moment. The 3-strut linkage system of the embodiment illustrated in FIGS. 1–3 has been replaced with a linkage mechanism that comprises two struts and a slotted roller disposed on a lever arm. As will be appreciated by those of skill in the art, the fluid level control system illustrated in FIG. 4 can be modified, for example, to include a linkage adjustment system similar (or dissimilar) to the one used in the embodiment illustrated in FIGS. 1–3. FIG. 4 also shows that the fluid level control system may be disposed downstream with respect to a fluid treatment zone (see, for example, fluid treatment zone 112 in FIG. 3 of incorporated-by reference U.S. Pat. No. 5,418,370). Of course, as readily apparent to those of ordinary skill in the art, the fluid level control system may be disposed upstream with respect to the fluid treatment zone, or interposed between two fluid treatment zones.

Figure 5:
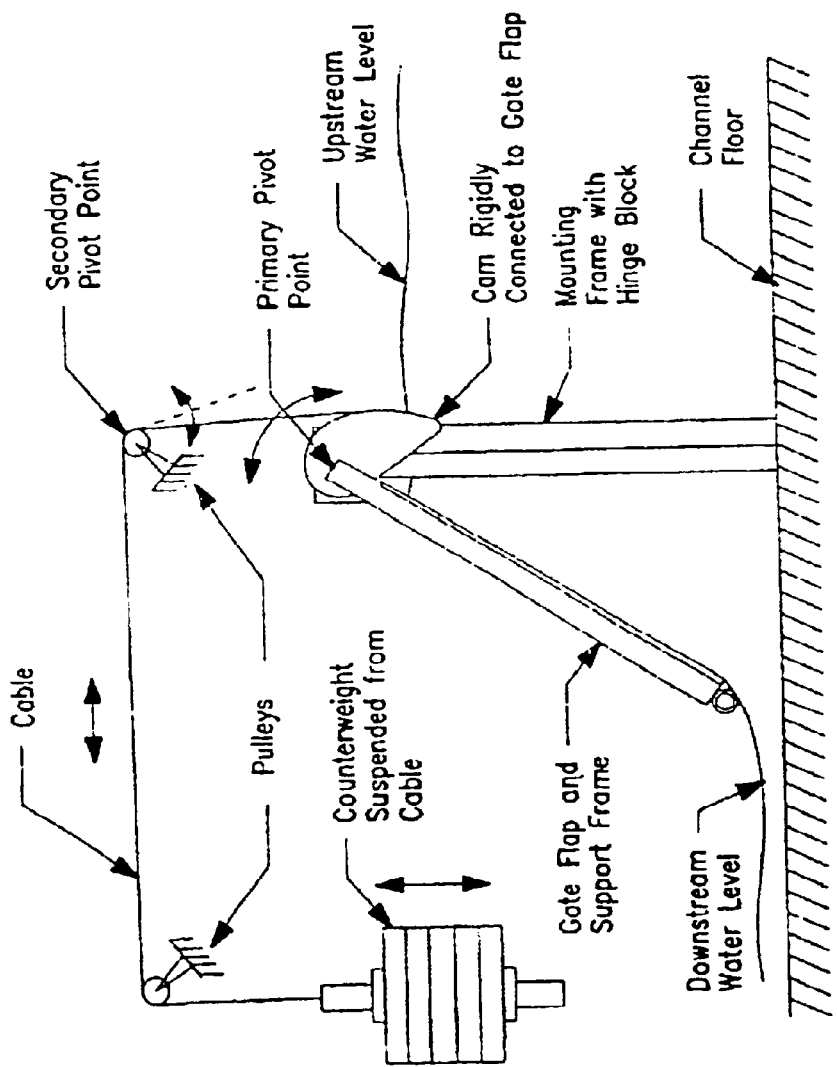
FIG. 5 illustrates a side elevation, in schematic, of a second alternate embodiment of the present fluid level control system.

With reference to FIG. 5, there is illustrated a further alternate embodiment of the present fluid level control system. Here, the counterbalance gate uses a cam, cable, and pulley arrangement to achieve the nonlinear restoring moment. The 3-strut linkage mechanism and the entire lever arm of the embodiment illustrated in FIGS. 1–3 has been replaced with a cable, a pair of pulleys and a non-circular cam. As shown, once the cam rotates, a portion of the cable pivots about one of the pulleys.

Figure 6:
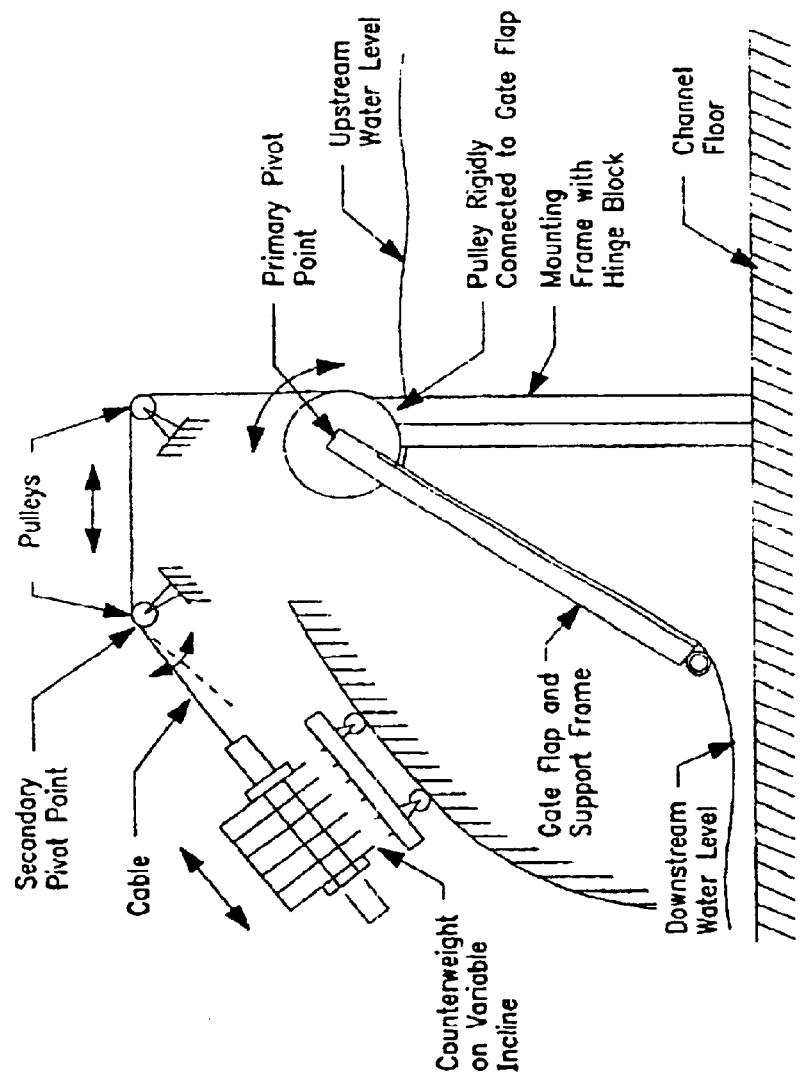
FIG. 6 illustrates a side elevation, in schematic, of a third alternate embodiment of the present fluid level control system

With reference to FIG. 6, there is illustrated a further embodiment of the present fluid level control system. Here, counterbalance gate uses a cable, pulleys, and a variable incline arrangement to achieve the restoring moment. The cam of the arrangement shown in FIG. 5 has been replaced with a circular pulley. Further, the counterweights are disposed on a variably inclined surface such that when the counterweights move along this surface, a portion of this cable pivots about one of the pulleys as illustrated.

Figure 7:
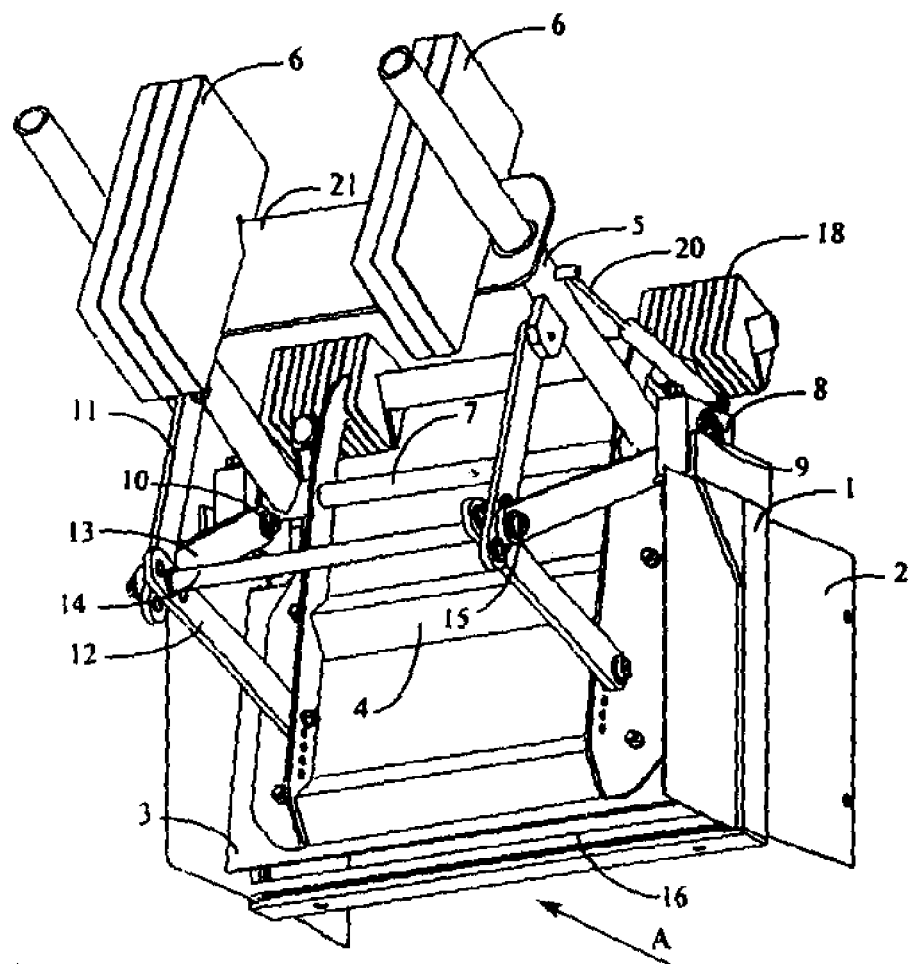
FIG. 7 illustrates a downstream perspective view of a fourth embodiment of the present fluid level control system.
Figure 8:
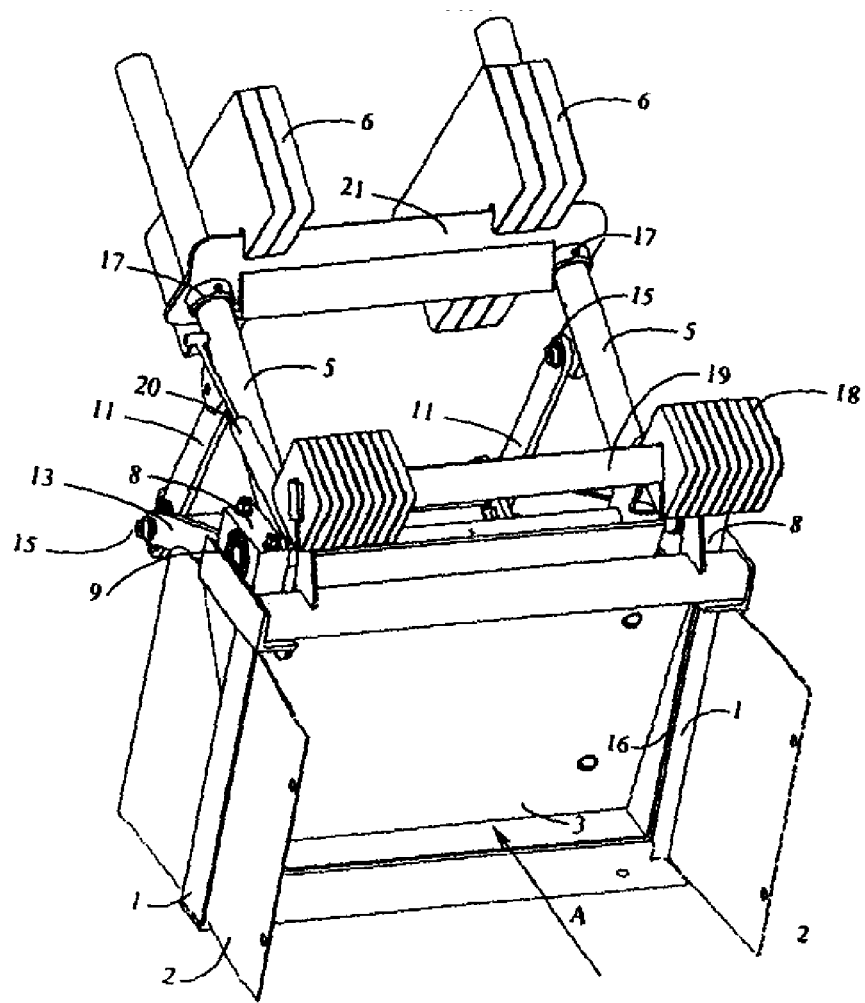
FIG. 8 illustrates an upstream perspective view of the embodiment illustrated in FIG. 7.
Figure 9:
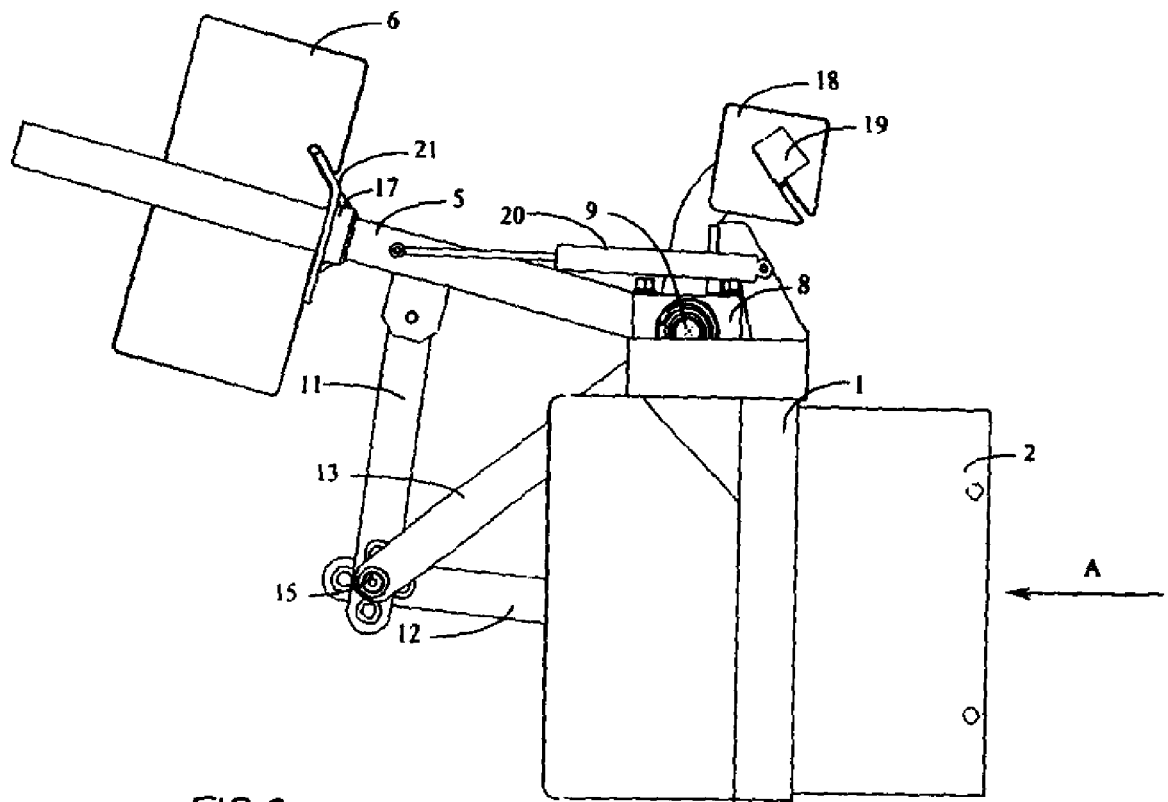
FIG. 9 illustrates a side elevation of the embodiment of the present fluid level control system illustrated in FIGS. 7 and 8.
Figure 1:
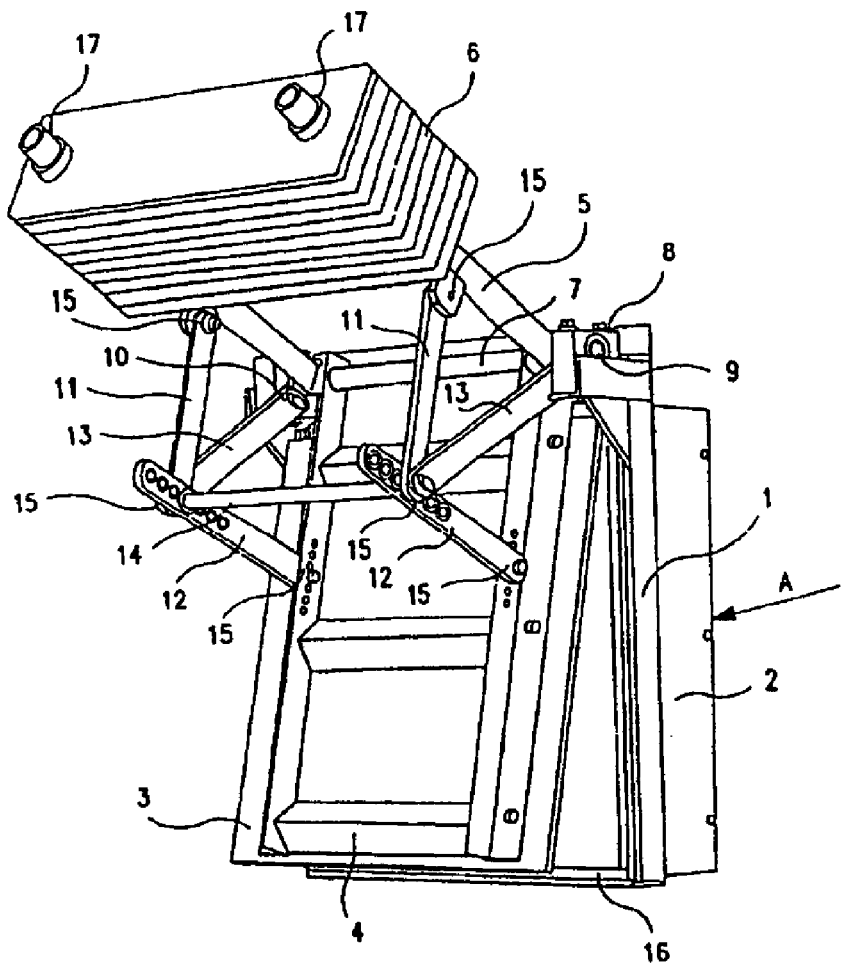
Figure 2:
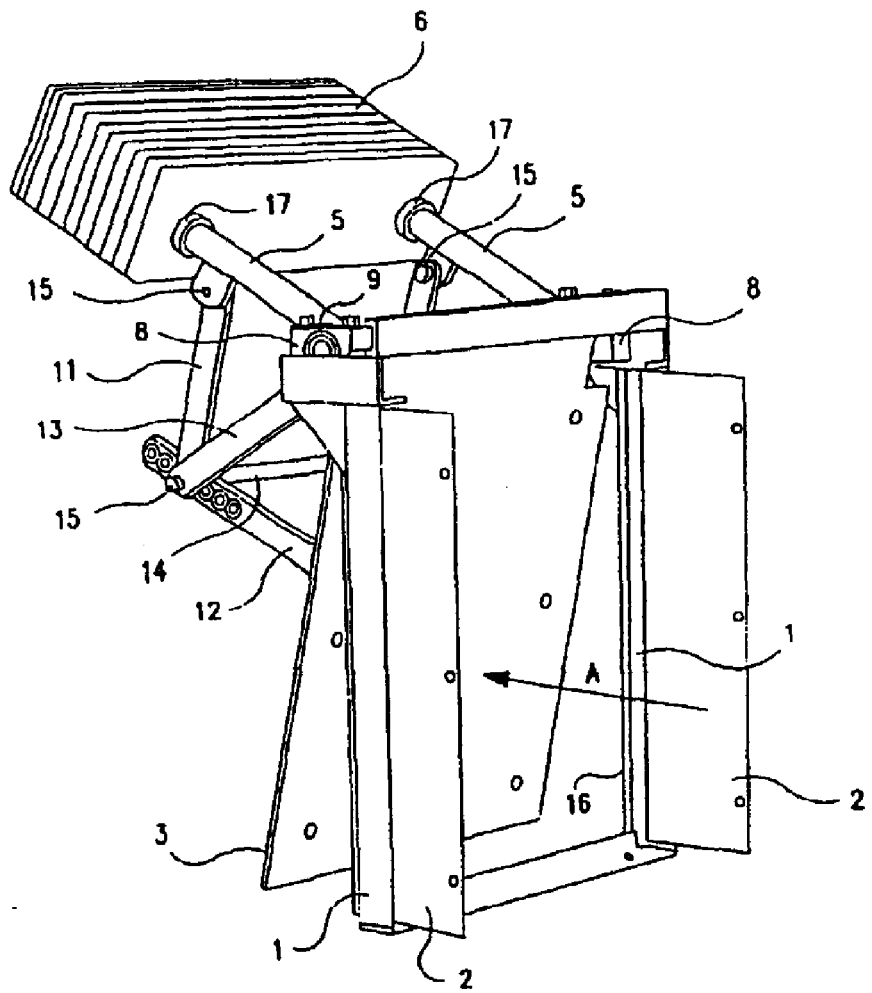
Figure 3:
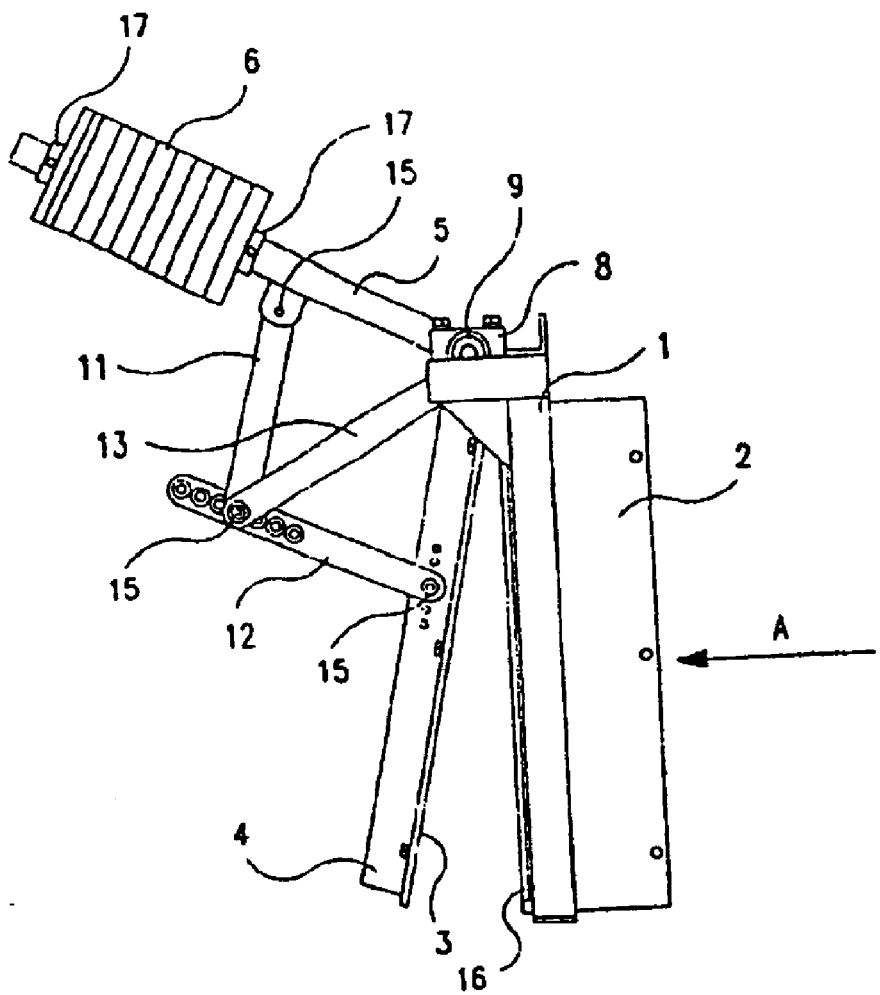
Figure 4:
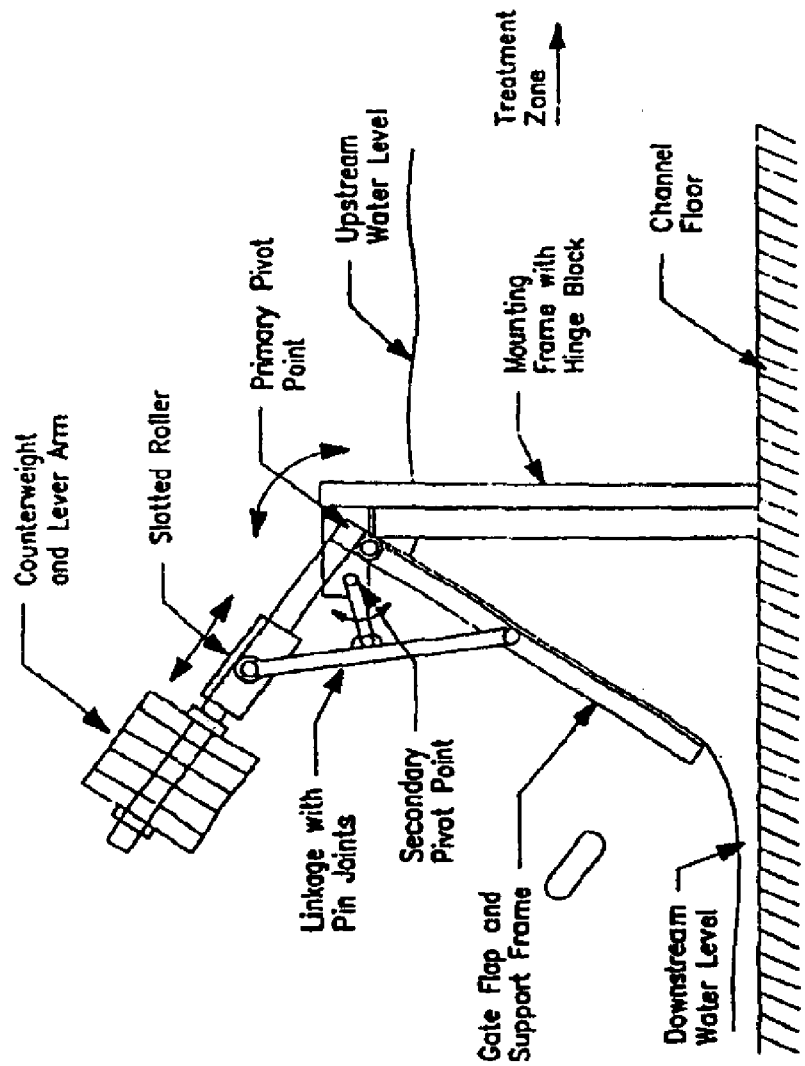
Figure 5:
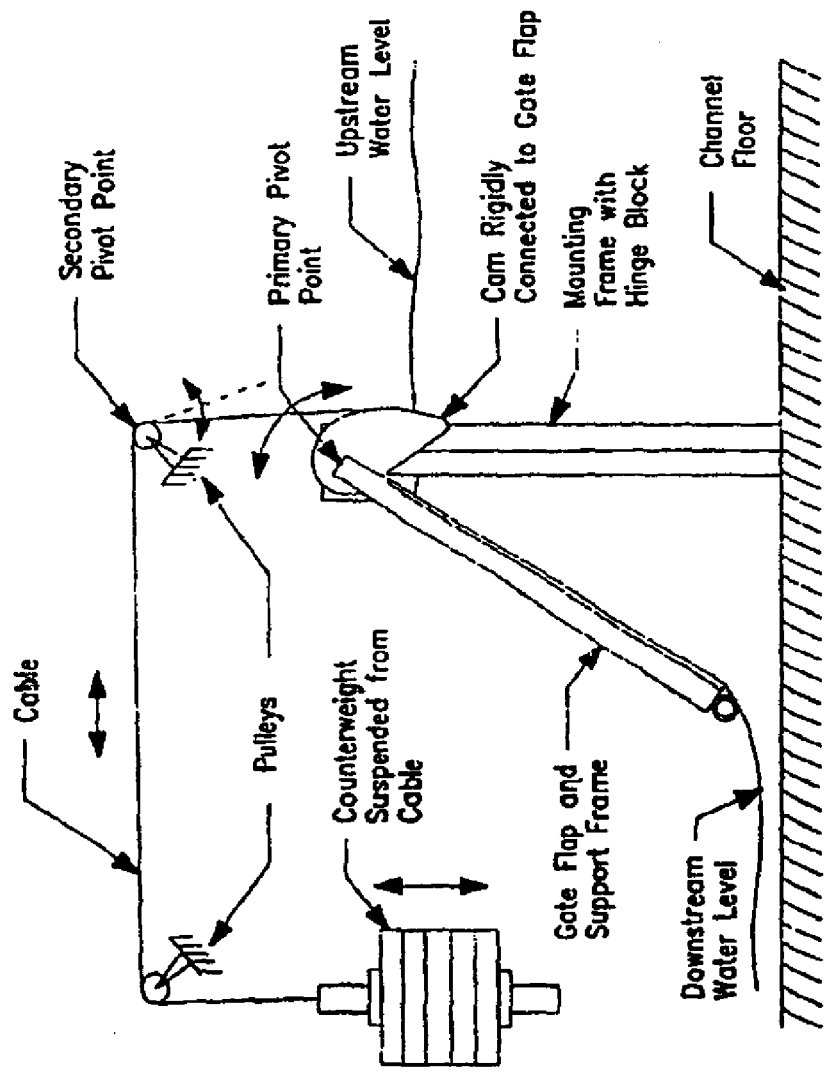
Figure 6:
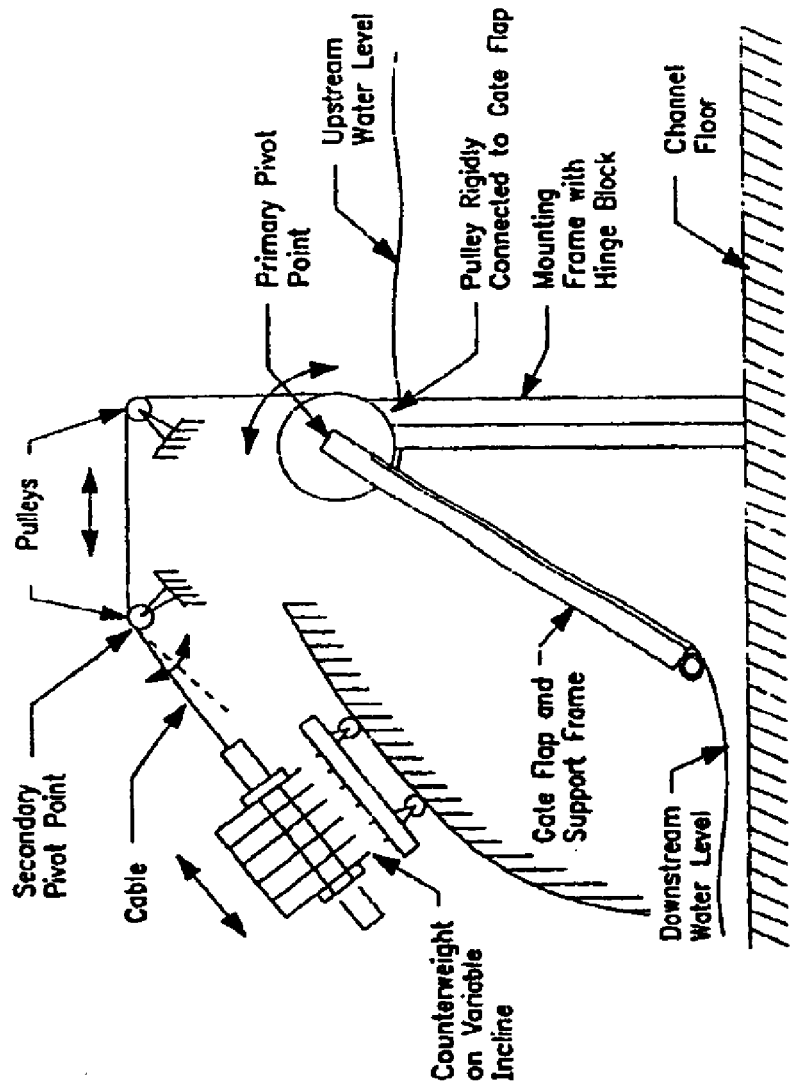
Figure 7:
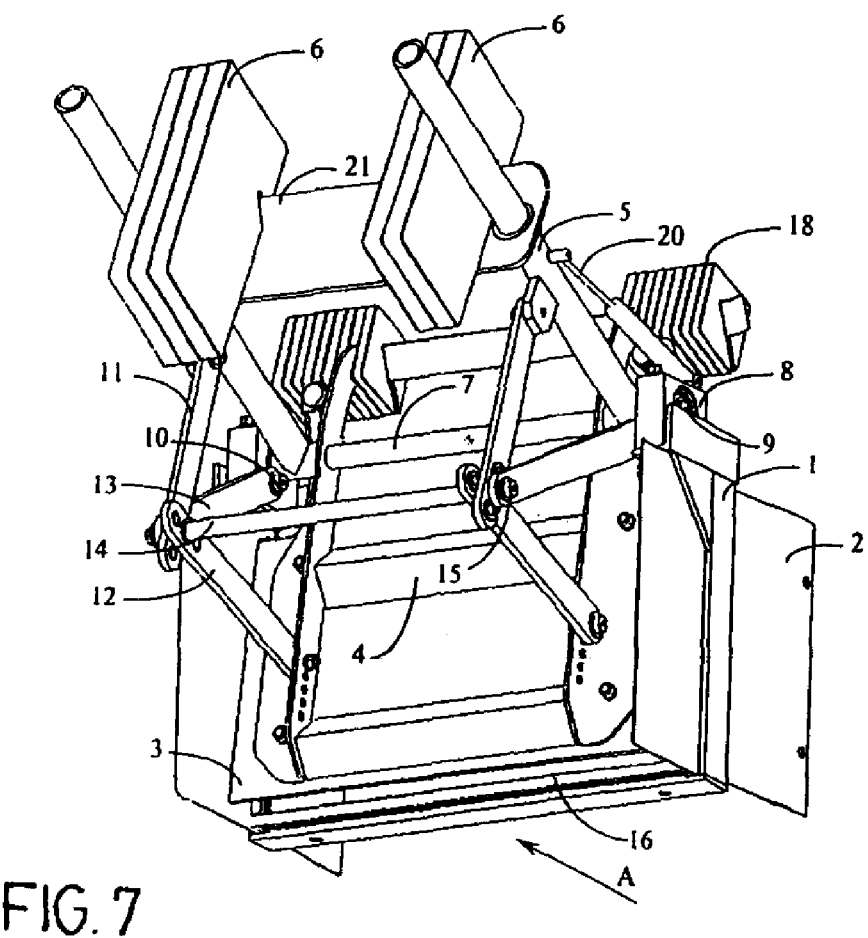
Figure 8:
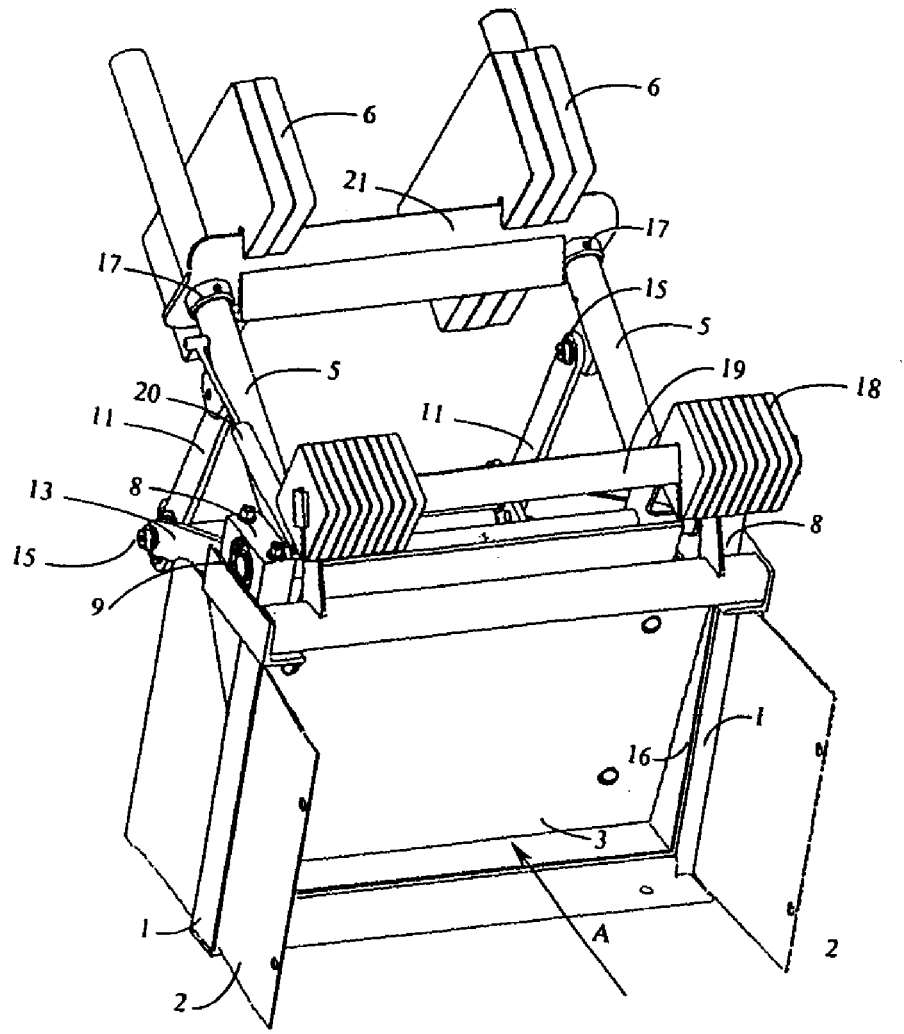
Figure 9:
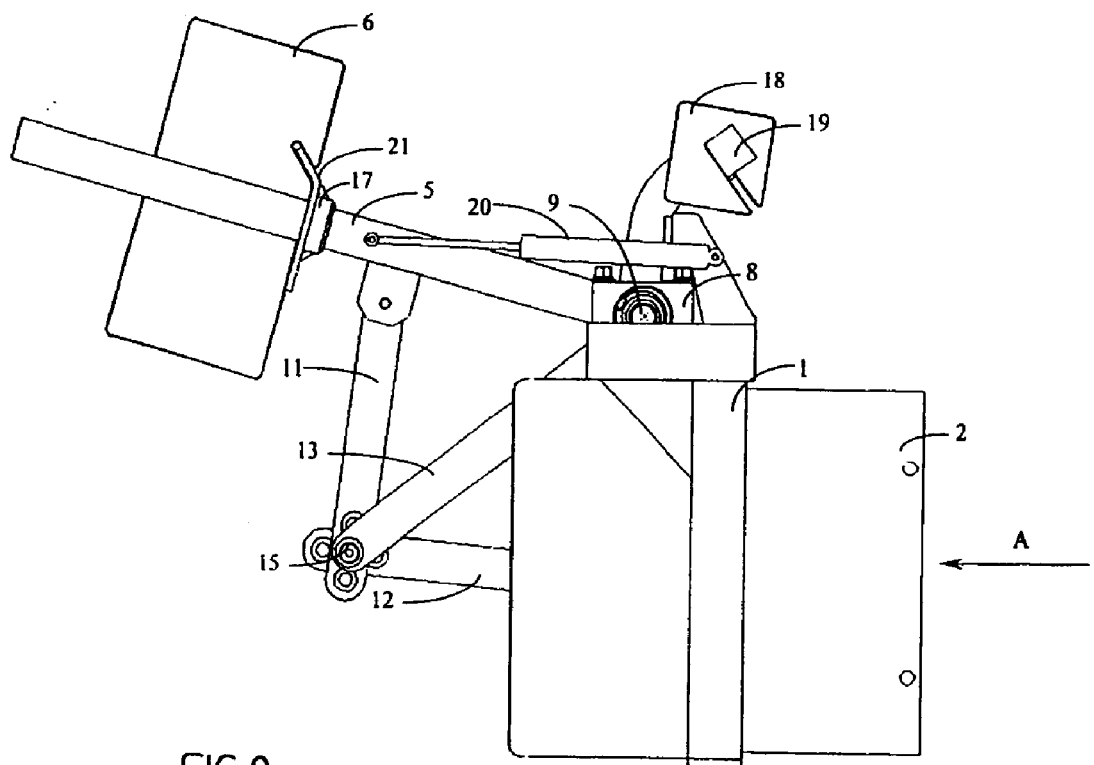

With reference to FIGS. 7–9, there is illustrated an alternate embodiment of the present fluid level control system. In FIGS. 7–9, a number of reference numerals are used which are common to the embodiment illustrated in FIGS. 1–3. Those of skill in the art will understand that like reference numerals are intended to denote like elements between the embodiment illustrated in FIGS. 1–3 and the embodiment illustrated in FIGS. 7–9.

Thus, with reference to the embodiment illustrated in FIGS. 7–9, it will be seen that flap counterweight support 19 is connected to flap support frame 4. A dampener 20 interconnects one of lever arms 5 and flap support frame 4. Dampener 20 serves to reduce the transient moments acting on gate flap 3. Also, it will be seen that the plurality of lever counterweights 6 is mounted on lever arm 5 in a manner slightly different than shown in FIGS. 1–3. Specifically, lever counterweights 6 are disposed on a counterweight support 21 thereby reducing the number of retaining collars 17 needed in the embodiment illustrated in FIGS. 7–9 when compared to the embodiment illustrated in FIGS. 1–3.

As will be seen, a plurality of flap counterweights 18 are notched at an angle, which allows them to be slided on flap counterweight support 19, but prevent them from sliding off within the full range of motion of gate flap 3. Those of skill in the art will recognize that one or both of lever counterweights 6 and flap counterweights 18 may be attached to the system by other mechanical (or non-mechanical) means— e.g., bolts, clamps, wires and the like.

The embodiment of the present fluid control system illustrated in FIGS. 7–9 may be operated in a manner similar to that described above with respect to the embodiment illustrated in FIGS. 1–3.

The embodiment of the present fluid level control system illustrated in FIGS. 7–9 is particularly well suited to be used in applications where relatively small gate sizes are needed or are desirable. Specifically, smaller gate sizes have less hydraulic forces acting on the flap and these forces generally act closer to the primary pivot point referred to above. In the result, there is less hydraulic moment and therefore the gate requires less restoring moment, causing the restoring moment created by the weight of the flap to become significant. In some situations, it may be difficult for lever counterweights 6, together with the aggregate weight of gate flap 3, flap support frame 4, the associated linkages and the associated hardware, to compensate for the hydraulic moment acting on gate flap 3. In the embodiment illustrated in FIGS. 1–3, this is due at least in part to the relatively large angle that separates the flap and lever counterweights 6 which causes the restoring moment of the flap weight to be relatively large whereas the restoring moment of the counterweight is relatively small. In the result, in certain applications, failure to compensate for the weight of the flap can lead to poor performance of water level control of the overall system.

The embodiment illustrated in FIGS. 7–9 illustrates one manner by which this problem may be solved. Specifically, flap counterweights 18 are used to balance gate flap 3. Preferably, the aggregate weight of flap counterweights 18 is chosen to substantially balance the aggregate weight of gate flap 3, flap support frame 4, the associated linkages and the associated hardware about the first pivot point. Preferably, flap counterweight 18 is positioned so as to locate the combined centre of mass of gate flap 3, flap support frame 4, the associated linkages, the associated hardware and flap counterweights 18 to be substantially coterminous with or substantially juxtaposed with respect to the primary pivot point throughout the full range of opening of gate flap 3. This minimizes the resulting restoring moment caused by gate flap 3. In the result, this improves the function of the present fluid level control system when implemented for smaller gate sizes and enhances the performance of the present fluid level control system when implemented in larger gate sizes. Thus, the embodiment of the present fluid level control system illustrated in FIGS. 7–9 is suited for use with gates having various flap weights and sizes Thus, those of skill in the art will readily appreciate that the feature characterizing each of the illustrated embodiments of the present fluid level control system is a pair of distinct pivot points, one for the flap portion of the gate itself and the other comprised in the linkage mechanism connecting the lever portion and the gate.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to modify the embodiment illustrated in FIGS. 7–9 to include cylinders, pulleys and the like to supplement or replace the plurality of flap counterweights 18. Further, it should be appreciated that dampener 20 illustrated in FIGS. 7–9 is optional and does not need to be used in all applications of the present fluid level control system. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

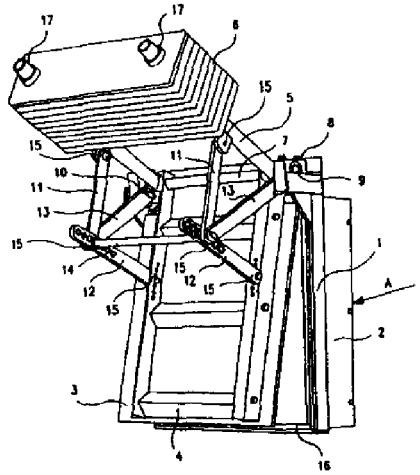

What is claimed is:

1. A fluid level control system for controlling a flow of fluid, the system comprising:

a gate having a flap portion interconnected to a lever portion, the flap portion being rotatable about a first pivot point, the flap portion comprising a first weight;

a frame fixed with respect to the flap portion; and a linkage interconnecting flap portion and the lever portion and being connected to the frame at a second pivot point different than the first pivot point;

wherein the flap portion is rotatable about the first pivot point upon being impacted by the flow of fluid and the linkage is rotatable about the second pivot point to change a closing moment of the gate; and wherein the flap portion comprises first adjustment means for adjustably locating the first pivot point.

2. The fluid level control system defined in claim 1, further comprising adjustment means to alter a relative angle between the lever portion and the flap portion.

3. The fluid level control system defined in claim 1, wherein the flap portion and the linkage are sequentially rotatable.

4. The fluid level control system defined in claim 1, wherein the flap portion and the linkage are concurrently rotatable.

5. The fluid level control system defined in claim 1, wherein rotation of the flap portion about the first pivot point causes rotation of the linkage about the second pivot point.

6. The fluid level control system defined in claim 1, wherein the flap portion comprises a planar surface.

7. The fluid level control system defined in claim 1, wherein the flap portion comprises a non-planar surface.

8. The fluid level control system defined in claim 1, wherein the flap portion comprises a curved surface.

9. The fluid level control system defined in claim 1, wherein the lever portion comprises a lever arm.

10. The fluid level control system defined in claim 9, wherein the lever arm comprises a second weight at a distal portion thereof.

11. The fluid level control system defined in claim 1, wherein the linkage comprises a plurality of struts.

12. The fluid level control system defined in claim 1, wherein the linkage comprises a first strut, a second strut and a third strut.

13. The fluid level control system defined in claim 12, wherein the first strut, the second strut and the third strut are interconnected at a third pivot point.

14. The fluid level control system defined in claim 12, wherein the first strut is connected to the lever portion.

15. The fluid level control system defined in claim 12, wherein the second strut is connected to the flap portion.

16. The fluid level control system defined in claim 12, wherein the third strut is connected to the frame at the second pivot point.

17. The fluid level control system defined in claim 12, wherein second strut comprises second adjustment means for adjustably locating the third pivot point.

18. The fluid level control system defined in claim 12, wherein the linkage is connected to the lever portion by a slidable connector.

19. The fluid level control system defined in claim 18, wherein the slidable connector comprises a slotted roller.

20. The fluid level control system defined in claim 1, wherein the first pivot point, the second pivot point and third pivot point are disposed in a substantially non-linear relationship with respect to one another.

21. The fluid level control system defined in claim 1, wherein the gate portion and the lever portion are disposed in a substantially orthogonal relationship with respect to one another.

22. The fluid level control system defined in claim 1, wherein the lever portion comprises a first cable portion and the linkage comprises a second cable portion.

23. The fluid level control system defined in claim 22, wherein the first cable portion and the second cable portion are interconnected to one another at the second pivot point.

24. The fluid level control system defined in claim 22, wherein the second cable portion is connected to flap portion via a cam portion.

25. A fluid treatment system comprising:
   (i) a fluid treatment zone disposed in an open channel having a flow of fluid therein, and
   (ii) fluid level control system comprising:
      a gate having a flap portion interconnected to a lever portion, the flap portion being rotatable about a first pivot point, the flap portion comprising a first weight;
      a frame fixed with respect to the flap portion; and
      a linkage interconnecting the flap portion and the lever portion and being connected to the frame at a second pivot point different than the first pivot point;
      wherein the flap portion is rotatable about the first pivot point upon being contacted by the flow of fluid and the linkage is rotatable about the second pivot point to to change a closing moment of the gate; and
      wherein the flap portion comprises first adjustment means for adjustably locating the first pivot point.

26. The fluid treatment system defined in claim 25, wherein the lever portion comprises a lever arm.

27. The fluid treatment system defined in claim 26, wherein the lever arm comprises a second weight at a distal portion thereof.

28. The fluid treatment system defined in claim 25, wherein the linkage comprises a plurality of struts.

29. The fluid treatment system defined in claim 25, wherein the linkage comprises a first strut, a second strut and a third strut.

30. The fluid treatment system defined in claim 29, wherein the first strut, the second strut and the third strut are interconnected at third pivot point.

31. The fluid treatment system defined in claim 29, wherein the first strut is connected to the lever portion.

32. The fluid treatment system defined in claim 25, wherein the second strut is connected to the flap portion.

33. The fluid treatment system defined in claim 29, wherein the third strut is connected to the frame at the second pivot point.

34. The fluid treatment system defined in claim 29, wherein the second strut comprises second adjustment means for adjustably locating the third pivot point.

35. The fluid treatment system defined in claim 25, wherein the first pivot point, the second pivot point and third pivot point are disposed in a substantially non-linear relationship with respect to one another.

36. The fluid treatment system defined claim 25, wherein the gate portion and the lever portion are disposed in a substantially orthogonal relationship with respect to one another.

37. The fluid treatment system defined in claim 25, wherein the flap portion comprises first adjustment means for adjustably locating the first pivot point.

38. The fluid treatment system defined in claim 25, wherein the linkage is connected to the lever portion by a slidable connector.

39. The fluid treatment system defined in claim 38, wherein the slidable connector comprises a slotted roller.

40. The fluid treatment system defined in claim 25, wherein the lever portion comprises a first cable portion and the linkage comprises a second cable portion.

41. The fluid treatment system defined in claim 40, wherein the first cable portion and the second cable portion are interconnected to one another at the second pivot point.

42. The fluid treatment system defined in claim 40, wherein the second cable portion is connected to flap portion via a cam portion.

43. The fluid treatment system defined in claim 25, wherein the flow of fluid is gravity fed.

44. The fluid treatment system defined in claim 25, wherein the fluid level control system is disposed downstream with respect to the fluid treatment zone.

45. The fluid treatment system defined in claim 25, wherein the fluid level control system is disposed upstream with respect to the fluid treatment zone.

46. The fluid treatment system defined in claim 25, comprises a plurality of fluid treatment zones and a fluid level control system interposed between two of said plurality of fluid treatment zones.

47. A method for controlling the level of a flow of fluid in a channel at a desired level with the fluid treatment system defined in claim 25, the method comprising the steps of:

disposing the flap portion in the channel such that the flow of fluid contacts the flap portion at a first applied force; and altering a flow condition of the fluid to cause the flow of fluid to contact the flap portion at a second applied force different than the first applied force to cause relative movement between the flap portion and the lever portion.

* * * * *

UNITED STATES PATENT AND TRADEMARK OFFICE
CERTIFICATE OF CORRECTION

PATENT NO.   : 6,719,491 B2
DATED        : April 13, 2004
INVENTOR(S)  : Kezle

It is certified that error appears in the above-identified patent and that said Letters Patent is hereby corrected as shown below:

Please replace old drawings with these new drawings 7, 8, 9, that is attached here.

Signed and Sealed this

Fifth Day of April, 2005

JON W. DUDAS
*Director of the United States Patent and Trademark Office*

United States Patent
Kezele et al.

(10) Patent No.: US 6,719,491 B2
(45) Date of Patent: *Apr. 13, 2004

(54) FLUID LEVEL CONTROL SYSTEM

(75) Inventors: Dusko Antonio Kezele, London (CA); Jason J. Cerny, London (CA); Alan J. Royce, London (CA); Fariborz Taghipour, London (CA); George Traubenberg, London (CA); Edward P. Kambulow, London (CA)

(73) Assignee: Trojan Technologies Inc., London (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/067,398
(22) Filed: Feb. 7, 2002

(65) Prior Publication Data

US 2003/0024859 A1 Feb. 6, 2003

Related U.S. Application Data

(63) Continuation-in-part of application No. 09/921,268, filed on Aug. 3, 2001.
(51) Int. Cl.[7] ............................................. E02B 7/40
(52) U.S. Cl. ..................... 405/100; 405/87; 405/94; 405/99; 405/93; 210/262
(58) Field of Search ........................... 405/94, 87, 99, 405/100, 93; 210/744, 262

(56) References Cited

U.S. PATENT DOCUMENTS

| | | | |
|---|---|---|---|
| 648,312 A | * | 4/1900 | Taylor ........................ 405/93 |
| 973,172 A | * | 10/1910 | Collar ........................ 405/97 |
| 3,217,497 A | * | 11/1965 | Humphreys et al. ........ 405/93 |
| 3,300,985 A | * | 1/1967 | Humphreys et al. ........ 405/93 |
| 3,815,627 A | * | 6/1974 | Farrell et al. .............. 137/486 |

(List continued on next page.)

FOREIGN PATENT DOCUMENTS

| | | | |
|---|---|---|---|
| DE | 340979 | 9/1921 | |
| DE | 0458224 a1 | 5/1991 | ............ E03F/5/10 |
| EP | 422233 | 7/1921 | |
| FR | 2033187 | 12/1970 | ............ E02B/7/00 |

OTHER PUBLICATIONS

"Emerging Technologies Energy Water Connection", ITRC Report 01–003.
"Flap Gate For Automatic Upstream Canal Control", Charles M. Burt, Russdon Angold, Mike Lehmkuhl, and Stuart Styles, Irrigation Training And Research Center, California Polytechnic State University.

*Primary Examiner*—J. J. Swann
*Assistant Examiner*—Katherine W Mitchell
(74) *Attorney, Agent, or Firm*—Katten Muchin Zavis Rosenman

(57) ABSTRACT

A fluid level control system, particularly useful for controlling the level of water flowing in an open channel. The fluid level control system includes a gate having a flap portion interconnected to a lever portion. The flap portion is rotatable about a first pivot point. The system further includes a frame which is fixed with respect to the flap portion. A linkage interconnects the flap portion and the lever portion, and is connected to the frame at a second pivot point different than the first pivot point. Under changing flow conditions in the channel, the present system operates by both: (i) absolute movement of the lever portion and the flap portion, and (ii) relative movement between the lever portion and the flap portion. A fluid treatment system and a method for controlling the level of a flowing fluid may also use such a fluid level control system.

47 Claims, 9 Drawing Sheets

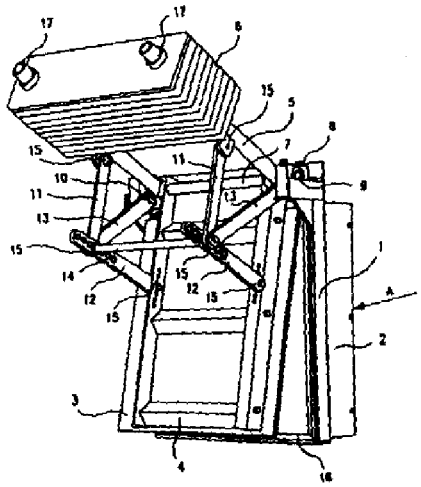

UNITED STATES PATENT AND TRADEMARK OFFICE
CERTIFICATE OF CORRECTION

PATENT NO.    : 6,719,491 B2
DATED         : April 13, 2004
INVENTOR(S)   : Kezele et al.

It is certified that error appears in the above-identified patent and that said Letters Patent is hereby corrected as shown below:

Delete the title page and substitute therefore the attached title page.

Delete Drawing Sheets 1-6 and substitute therefore the attached Drawing Sheets 1-9.

This certificate supersedes Certificate of Correction issued April 5, 2005.

Signed and Sealed this

Twenty-fourth Day of May, 2005

JON W. DUDAS
*Director of the United States Patent and Trademark Office*

(12) United States Patent
Kezele et al.

(10) Patent No.: US 6,719,491 B2
(45) Date of Patent: *Apr. 13, 2004

(54) FLUID LEVEL CONTROL SYSTEM

(75) Inventors: Dusko Antonio Kezele, London (CA); Jason J. Cerny, London (CA); Alan J. Royce, London (CA); Fariborz Taghipour, London (CA); George Traubenberg, London (CA); Edward P. Kambulow, London (CA)

(73) Assignee: Trojan Technologies Inc., London (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/067,398

(22) Filed: Feb. 7, 2002

(65) Prior Publication Data

US 2003/0024859 A1 Feb. 6, 2003

Related U.S. Application Data

(63) Continuation-in-part of application No. 09/921,268, filed on Aug. 3, 2001.

(51) Int. Cl.[7] .................................................. E02B 7/40
(52) U.S. Cl. .................. 405/100; 405/87; 405/94; 405/99; 405/93; 210/262
(58) Field of Search .................. 405/94, 87, 99, 405/100, 93; 210/744, 262

(56) References Cited

U.S. PATENT DOCUMENTS

| | | | | |
|---|---|---|---|---|
| 648,312 A | * | 4/1900 | Taylor | 405/93 |
| 973,172 A | * | 10/1910 | Collar | 405/97 |
| 3,217,497 A | * | 11/1965 | Humphreys et al. | 405/93 |
| 3,300,985 A | * | 1/1967 | Humphreys et al. | 405/93 |
| 3,815,627 A | * | 6/1974 | Farrell et al. | 137/486 |

(List continued on next page.)

FOREIGN PATENT DOCUMENTS

| | | | |
|---|---|---|---|
| DE | 340979 | 9/1921 | |
| DE | 0458224 a1 | 5/1991 | E03F/5/10 |
| EP | 422233 | 7/1921 | |
| FR | 2033187 | 12/1970 | E02B/7/00 |

OTHER PUBLICATIONS

"Emerging Technologies Energy Water Connection", ITRC Report 01–003.

"Flap Gate For Automatic Upstream Canal Control", Charles M. Burt, Russdon Angold, Mike Lehmkuhl, and Stuart Styles, Irrigation Training And Research Center, California Polytechnic State University.

*Primary Examiner*—J. J. Swann
*Assistant Examiner*—Katherine W Mitchell
(74) *Attorney, Agent, or Firm*—Katten Muchin Zavis Rosenman

(57) ABSTRACT

A fluid level control system, particularly useful for controlling the level of water flowing in an open channel. The fluid level control system includes a gate having a flap portion interconnected to a lever portion. The flap portion is rotatable about a first pivot point. The system further includes a frame which is fixed with respect to the flap portion. A linkage interconnects the flap portion and the lever portion, and is connected to the frame at a second pivot point different than the first pivot point. Under changing flow conditions in the channel, the present system operates by both: (i) absolute movement of the lever portion and the flap portion, and (ii) relative movement between the lever portion and the flap portion. A fluid treatment system and a method for controlling the level of a flowing fluid may also use such a fluid level control system.

47 Claims, 9 Drawing sheets